US011738427B1

(12) United States Patent
Asano et al.

(10) Patent No.: US 11,738,427 B1
(45) Date of Patent: Aug. 29, 2023

(54) RING MOUNTING JIG AND RING MOUNTING METHOD

(71) Applicant: TOYOTA JIDOSHA KABUSHIKI KAISHA, Toyota (JP)

(72) Inventors: Junji Asano, Kariya (JP); Yoshihiro Shiraishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/167,526

(22) Filed: Feb. 10, 2023

(30) Foreign Application Priority Data

Apr. 26, 2022 (JP) ................................. 2022-072445

(51) Int. Cl.
  *B25B 27/02* (2006.01)
  *F16J 15/32* (2016.01)
  *F16J 15/34* (2006.01)

(52) U.S. Cl.
  CPC .................................... *B25B 27/02* (2013.01)

(58) Field of Classification Search
  CPC .... B25B 27/02; F16J 15/3268; F16J 15/3272; F16J 15/3464
  See application file for complete search history.

(56) References Cited

U.S. PATENT DOCUMENTS

| 6,283,478 | B1 * | 9/2001 | Kumai | ....................... F16J 9/28 277/435 |
| 10,036,471 | B2 * | 7/2018 | Lemke | ....................... F16J 9/14 |

FOREIGN PATENT DOCUMENTS

| EP | 0937922 B1 * | 8/1999 | ................. F16J 9/28 |
| JP | 2003-039257 A | 2/2003 | |
| JP | 2003039257 A * | 2/2003 | |
| JP | 2015-182183 A | 10/2015 | |
| JP | 2015182183 A * | 10/2015 | ............. B25B 27/02 |
| WO | WO-2015029271 A1 * | 3/2015 | ............... C21D 1/06 |

* cited by examiner

*Primary Examiner* — Bayan Salone
(74) *Attorney, Agent, or Firm* — Oliff PLC (57) ABSTRACT

The ring mounting jig is a ring mounting jig for mounting a retaining ring made of metal having a first end portion, a second end portion having an outer diameter larger than that of the first end portion, and a first groove and a second groove provided in a circumferential direction of an outer peripheral surface of each of the first end portion and the second end portion, to the second groove on a shaft having the first end portion and the second end portion, without mounting a retaining ring made of metal having an inner diameter before expansion smaller than an outer diameter of the first end portion to the first groove from the first end portion. The ring mounting jig includes a ring expanding jig, a shaft fixing jig, a ring pushing jig, and a ring fitting jig.

2 Claims, 9 Drawing Sheets

RING MOUNTING JIG AND RING MOUNTING METHOD

CROSS-REFERENCE TO RELATED APPLICATION

This application claims priority to Japanese Patent Application No. 2022-072445 filed on Apr. 26, 2022, incorporated herein by reference in its entirety.

BACKGROUND

Technical Field

The present disclosure relates to a ring mounting jig and a ring mounting method.

2. Description of Related Art

A disclosure relating to a ring mounting jig for mounting a ring on a shaft, a ring mounting method, and a method of manufacturing a shaft has been known as the related art. A ring mounting jig of the related art described in Japanese Unexamined Patent Application Publication No. 2015-182183 (JP 2015-182183 A) includes a large diameter portion, a small diameter portion, and a connecting portion (JP 2015-182183 A, abstract, etc.). The large diameter portion includes a first central axis. The small diameter portion includes a second central axis that is eccentric with respect to the first central axis, and is smaller in diameter than the large diameter portion. The connecting portion includes an inclined surface provided between the large diameter portion and the small diameter portion and inclined from the small diameter portion toward the large diameter portion.

In the above-described ring mounting method of the related art, a ring is mounted into a groove portion provided at an end portion of the shaft in the central axial direction and provided over the entire circumference of the outer peripheral surface of the shaft using the ring mounting jig above (JP 2015-182183 A, claim 5, etc.). In this ring mounting method, first, the above-described ring mounting jig including the large diameter portion that is provided to have the same diameter as that of the outer peripheral surface of the shaft is prepared. Next, the first central axis is aligned with the central axis, and the large diameter portion is connected to an end portion of the shaft to dispose the ring mounting jig.

Further, the ring is disposed on the small diameter portion. Then, after the ring mounting jig is disposed, a first portion of the ring disposed at a position on the small diameter portion in the eccentric direction from the second central axis is caused to slide on the connection portion to engage with the groove portion. Then, after the first portion is engaged with the groove portion, the second portion other than the first portion of the ring is sequentially slid on the inclined surface from a position close to the first portion to engage with the groove portion.

Further, a disclosure that relates to an auxiliary jig for attaching an O-ring into a groove of each of a plurality of stages of a transmission shaft in a transmission assembly line of a vehicle engine has been known. An O-ring mounting jig of the related art described in Japanese Unexamined Patent Application Publication No. 2003-039257 (JP 2003-039257 A) is provided with a jig main body positioned in contact with a predetermined portion of a workpiece, and a guide member capable of changing its position with respect to the jig main body in a multistage manner. The outer surface of the guide member is a guide surface for mounting the O-ring.

Summary

In the above-described ring mounting jig and ring mounting method of the related art, when another groove is provided on the outer peripheral surface of the shaft in front of the intended groove into which the ring is to be mounted, the ring fits in the other groove in front of the intended groove, and the ring cannot be mounted in the intended groove. Further, with the above-described O-ring mounting jig of the related art, it is possible to mount the O-ring that is generally made of a rubber-based material and is easily expanded in the radial direction into each of the grooves of the multiple stages. However, it is difficult to mount the retaining ring that is made of metal and that is difficult to be expanded in the radial direction with the jig.

The present disclosure provides a ring mounting jig and a ring mounting method capable of mounting, to a shaft including a first groove and a second groove at a first end portion and a second end portion, respectively, a retaining ring that is made of metal and of which an inner diameter before expansion is smaller than outer diameters of the first end portion and the second end portion into the second groove from the first end portion without mounting the retaining ring into the first groove.

A ring mounting jig according to a first aspect of the present disclosure is a ring mounting jig for mounting, to a shaft provided with a first end portion, a second end portion of which an outer diameter is larger than the first end portion, and a first groove and a second groove provided in a circumferential direction of outer peripheral surfaces of the first end portion and the second end portion, respectively, a retaining ring of which an inner diameter before expansion is smaller than an outer diameter of the first end portion into the second groove of the second end portion from the first end portion without mounting the retaining ring into the first groove.

The ring mounting jig includes: a ring expanding jig including a small diameter end of which an outer diameter is smaller than the inner diameter of the retaining ring before expansion, an enlarged portion of which an outer diameter corresponds to the outer diameter of the second end portion of the shaft, a tapered surface that connects the small diameter end and the enlarged portion, and an insertion portion of which an outer diameter corresponds to the outer diameter of the first end portion of the shaft, and a step portion provided between the insertion portion and the enlarged portion; a shaft fixing jig including a cylindrical portion of which an inner diameter corresponds to the outer diameter of the first end portion of the shaft, and a ring holding portion that is provided at a tip end of the cylindrical portion in an axial direction and of which an outer diameter corresponds to the outer diameter of the second end portion of the shaft; a ring pushing jig including a cylindrical main body portion, an opening portion that is provided at a tip end of the main body portion and of which an inner diameter corresponds to the outer diameter of the small diameter end of the ring expanding jig, a plurality of divided grooves extending in an axial direction of the main body portion from the tip end of the main body portion, and a plurality of elastic portions, each of the elastic portions provided between the divided grooves and being elastically deformable in a radial direction of the main body portion; and a ring fitting jig that is disposed on an outer periphery of the cylindrical portion of the shaft fixing jig so as to be movable in an axial direction of the cylindrical portion, and includes a tip end portion that is movable from an outer peripheral surface of the ring holding portion to the second groove of the second end portion in a state where the first end portion of the shaft is inserted into and fixed to the cylindrical portion and the outer peripheral surface of the ring holding portion and the outer peripheral surface of the second end portion of the shaft are connected in the axial direction of the cylindrical portion.

A ring mounting method according to a second aspect of the present disclosure is a ring mounting method for mounting, using the ring mounting jig according to the first aspect above, the retaining ring into the second groove of the second end portion from the first end portion of the shaft without mounting the retaining ring into the first groove. The ring mounting method includes: connecting the outer peripheral surface of the ring holding portion and the outer peripheral surface of the enlarged portion of the ring expanding jig in the axial direction of the cylindrical portion by inserting the insertion portion of the ring expanding jig into the cylindrical portion of the shaft fixing jig and causing a tip end of the ring holding portion of the shaft fixing jig to abut the step portion of the ring expanding jig; inserting the small diameter end of the ring expanding jig inside the retaining ring and disposing the retaining ring on the tapered surface of the ring expanding jig; moving the retaining ring disposed on the tapered surface toward an outer periphery of the enlarged portion of the ring expanding jig using the elastic portions of the ring pushing jig to expand the retaining ring in a radial direction by inserting the small diameter end of the ring expanding jig into the opening portion of the ring pushing jig and pushing the ring pushing jig against the ring expanding jig; pushing the ring pushing jig against the ring expanding jig and the shaft fixing jig in a state where the outer peripheral surface of the ring holding portion of the shaft fixing jig and the outer peripheral surface of the enlarged portion of the ring expanding jig are connected in the axial direction of the cylindrical portion, and moving the retaining ring that is disposed on the outer peripheral surface of the enlarged portion of the ring expanding jig and is expanded toward the outer peripheral surface of the ring holding portion of the shaft fixing jig using the elastic portions; and inserting the first end portion of the shaft into the cylindrical portion of the shaft fixing jig and fixing the first end portion and moving the ring fitting jig in the axial direction of the cylindrical portion in the state where the outer peripheral surface of the ring holding portion and the outer peripheral surface of the second end portion of the shaft are connected in the axial direction of the cylindrical portion and moving the retaining ring disposed on the outer peripheral surface of the ring holding portion toward the outer peripheral surface of the second end portion using the tip end portion of the ring fitting jig to fit the retaining ring into the second groove.

According to each of the aspects above of the present disclosure, a ring mounting jig and a ring mounting method capable of mounting, to a shaft including a first groove and a second groove at a first end portion and a second end portion, respectively, a retaining ring that is made of metal and of which an inner diameter before expansion is smaller than outer diameters of the first end portion and the second end portion into the second groove from the first end portion without mounting the retaining ring into the first groove can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a ring mounting jig and a ring mounting method according to the present disclosure will be described with reference to the drawings.

Figure 1:
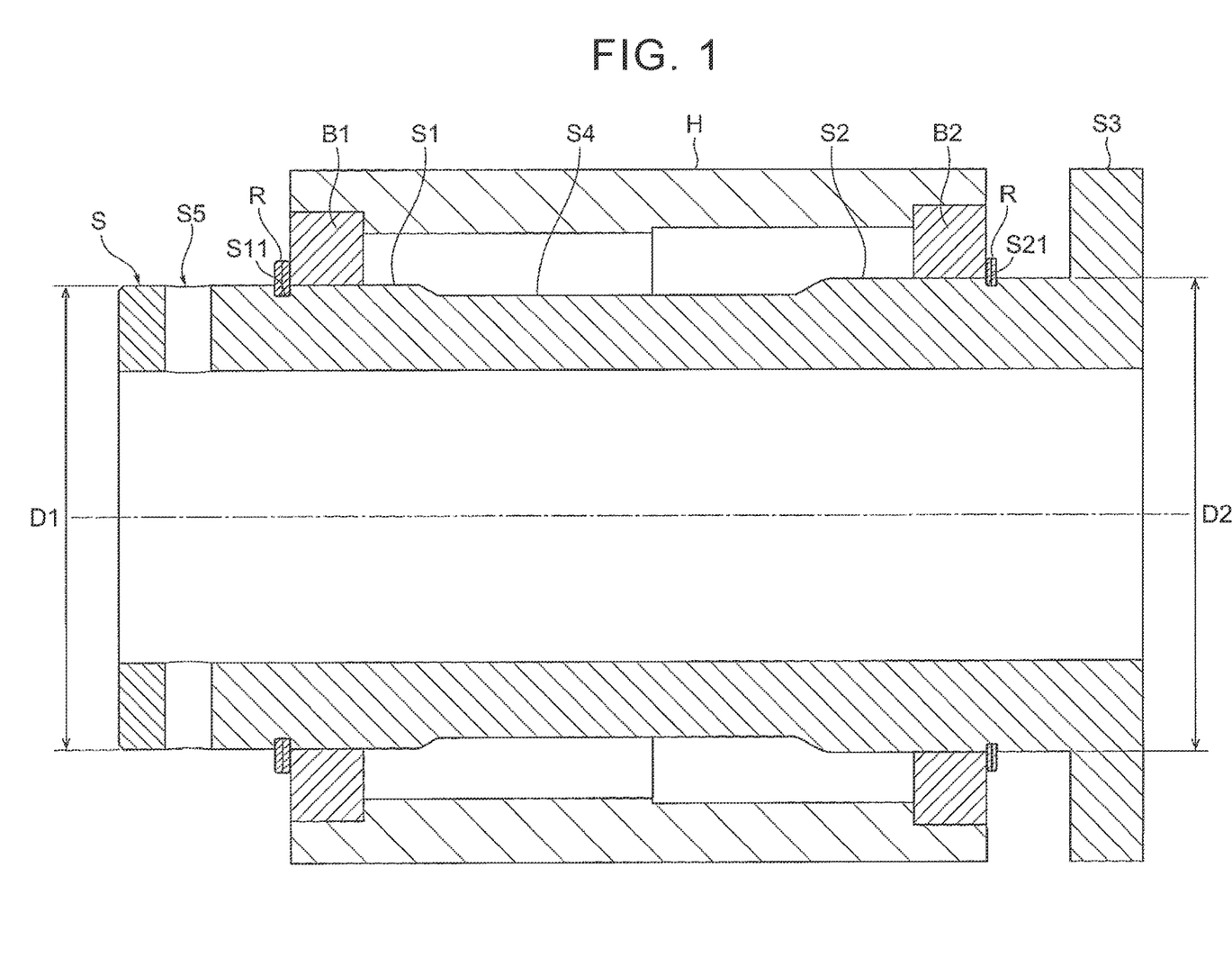
FIG. 1 is a cross-sectional view illustrating an example of a support structure of a shaft.
Figure 2:
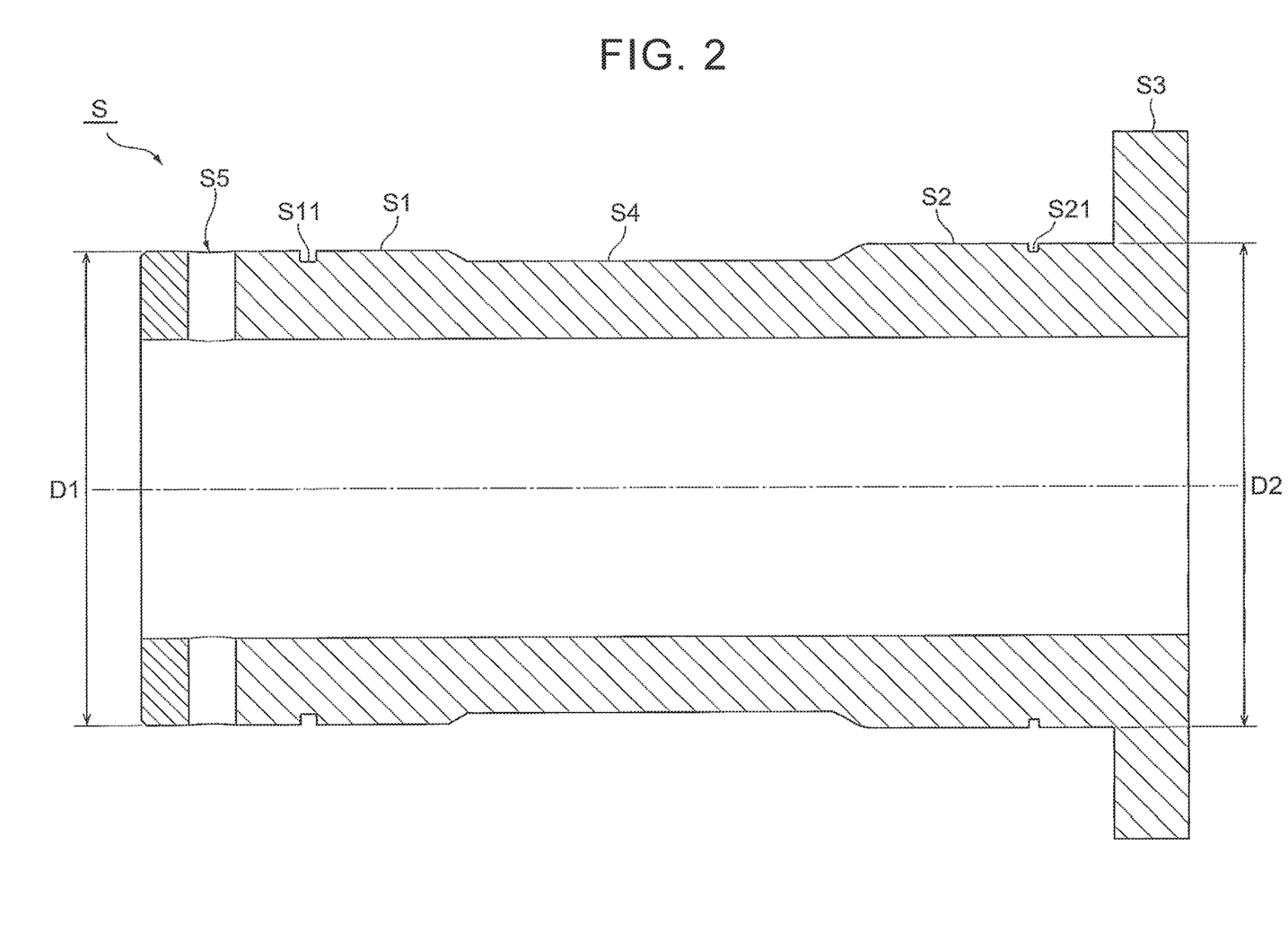
FIG. 2 is a cross-sectional view of the shaft shown in FIG. 1.

FIG. 1 is a cross-sectional view illustrating an example of a support structure of a shaft S to which a metal retaining ring R is mounted by a ring mounting jig and a ring mounting method according to the present disclosure. FIG. 2 is a cross-sectional view of the shaft S shown in FIG. 1.

The shaft S is, for example, a cylindrical or cylindrical metal member, and is a rotating body that is transmitted with power from a power source such as a motor or an engine and rotates around an axis. The shaft S has a first end portion S1 at one axial end and a second end portion S2 at the other axial end. Further, a flange S3 is provided at a tip end of the second end portion S2 of the shaft S. The flange S3 is provided in a disk shape having an outer diameter larger than an outer diameter of the second end portion S2 of the shaft S, and has an opening at a central portion thereof.

The shaft S has, for example, an intermediate portion S4 between the first end portion S1 and the second end portion S2 having an outer diameter smaller than that of the first end portion S1. The shaft S has, for example, a through-hole S5 that penetrates the first end portion S1. The through-hole S5 passes through the first end portion S1 in the radial direction of the shaft S so as to pass through the center of the shaft S, for example, and is provided between an end surface of the first end portion S1 opposite to the second end portion S2 and the first groove S11. The through-hole S5 is used for fixing the shaft S to a shaft fixing jig 120 (see FIG. 7) which will be described later.

The first end portion S1 and the second end portion S2 of the shaft S are rotatably supported by the housing H via bearing B1,B2. The outer diameter D2 of the second end portion S2 of the shaft S is, for example, larger than the outer diameter D1 of the first end portion S1 of the shaft S from the viewpoint of ease of assembling the bearing B1,B2. A first groove S1l is provided on an outer peripheral surface of the first end portion 51 of the shaft S, and a second groove S21 is provided on an outer peripheral surface of the second end portion S2 of the shaft S. The first groove S11 and the second groove S21 are provided over the entire circumference of the outer peripheral surface of the first end portion S1 and the second end portion S2 of the shaft S, for example.

The retaining ring R has an inner diameter before being expanded smaller than an outer diameter D1 of the first end portion S1. The retaining ring R is an annular member made of metal and can be elastically deformed and expanded in the radial direction. However, in order to expand the retaining ring R in the radial direction, a very large force is required as compared with a sealing material such as an O-ring made of rubber. The type of the retaining ring R is not particularly limited, but, for example, a double-wound or multi-wound spiral ring can be used.

The retaining ring R is expanded by being elastically deformed radially outward, is restored in the first groove S11 on the first end portion S1 of the shaft S and the second groove S21 in the second end portion S2, and is fitted into each of the first groove S11 and the second groove S21, thereby being attached to the shaft S. The retaining ring R mounted on the shaft S receives a thrust load of the shaft S and suppresses the shaft S and the bearing B1,B2 from moving axially of the shaft S with respect to the housing H.

In the embodiment shown in FIGS. 1 and 2, the shaft S has a first groove S11 and a second groove S21 at the first end portion S1 and the second end portion S2, respectively, but a flange S3 is provided at the second end portion S2. Therefore, in order to mount the retaining ring R to the second groove S21 of the second end portion S2, the retaining ring R needs to be fitted into the second groove S21 by moving from the first end portion S1 of the shaft S to the second end portion S2 beyond the first groove S11. However, it is not easy to attach a metallic retaining ring R having an inner diameter before expansion smaller than an outer diameter of the first end portion S1 to the second groove S21 without attaching the retaining ring R to the first groove S11 from the first end portion S1.

That is, when the ring mounting jig and the ring mounting method of the present embodiment described later are not used, the following problems occur. In comparison with a sealing material such as a relatively flexible O-ring, when the retaining ring R made of metal is expanded radially outward, a large elastic force acts radially inward. Therefore, it is difficult to expand the retaining ring R radially outward and attach the retaining ring R to the first groove S11 and the second groove S21 of the shaft S.

Further, when the radially expanded retaining ring R is to be attached to the second groove S21 on the second end portion S2 from the first end portion S1 of the shaft S, the retaining ring R may be fitted to the first groove S11 in front of the target second groove S21. Therefore, in order to securely expand the retaining ring R and fit it into the target second groove S21, the operation is repeated, and a long time is required for the mounting operation of the retaining ring R.

Further, with a general-purpose tool, it is difficult to generate a force necessary for expanding the retaining ring R in the radial direction or moving the retaining ring R in the axial direction of the shaft S. Therefore, not only a large force and a high degree of technology are required to mount the retaining ring R, but also the load of the mounting work is increased, and there is a possibility that the safety of the work is deteriorated. Hereinafter, an embodiment of a ring mounting jig and a ring mounting method according to the present disclosure that solve the above-described problem will be described.

Figure 3:
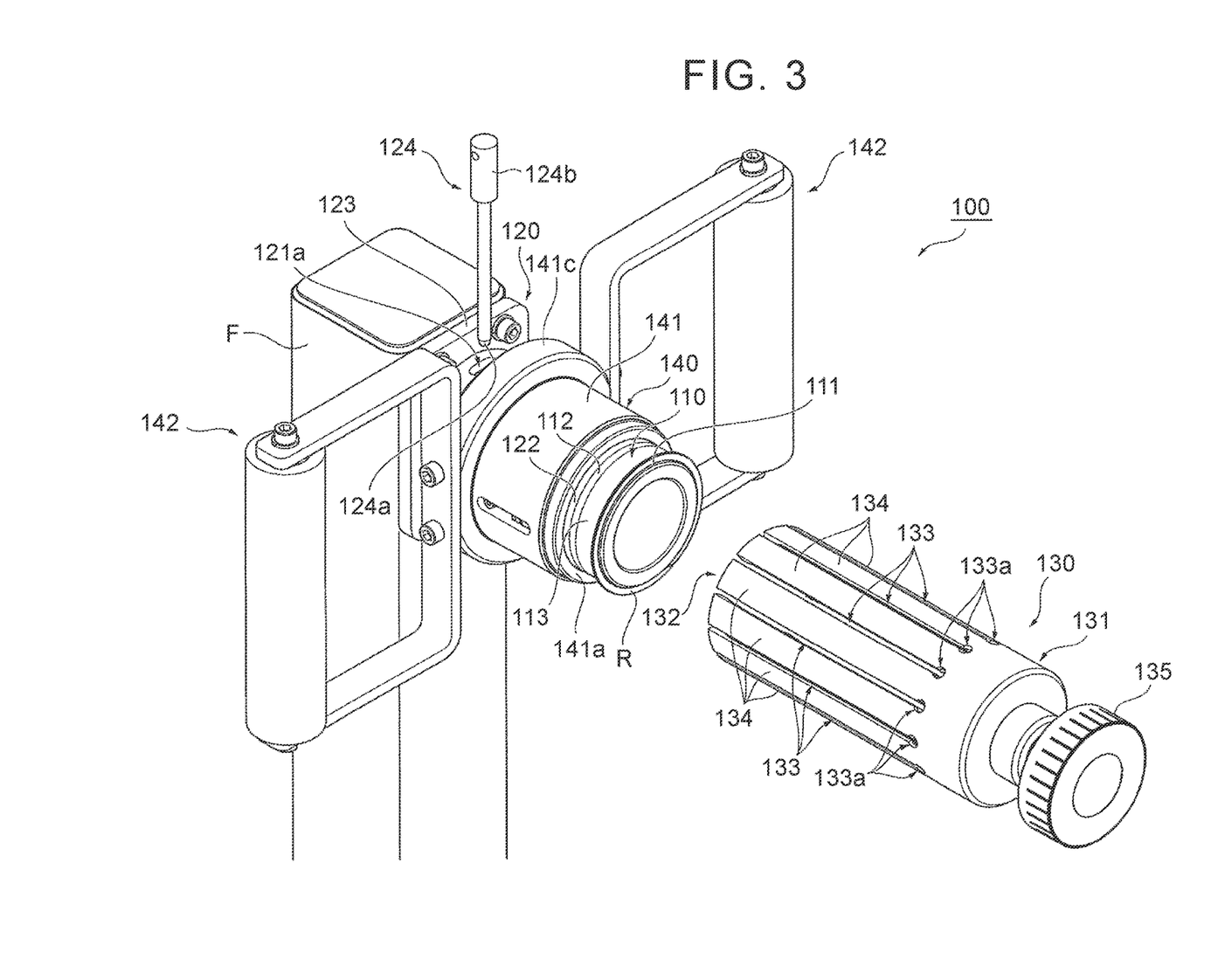
FIG. 3 is an exploded perspective view illustrating an embodiment of a ring mounting jig according to the present disclosure.
Figure 4:
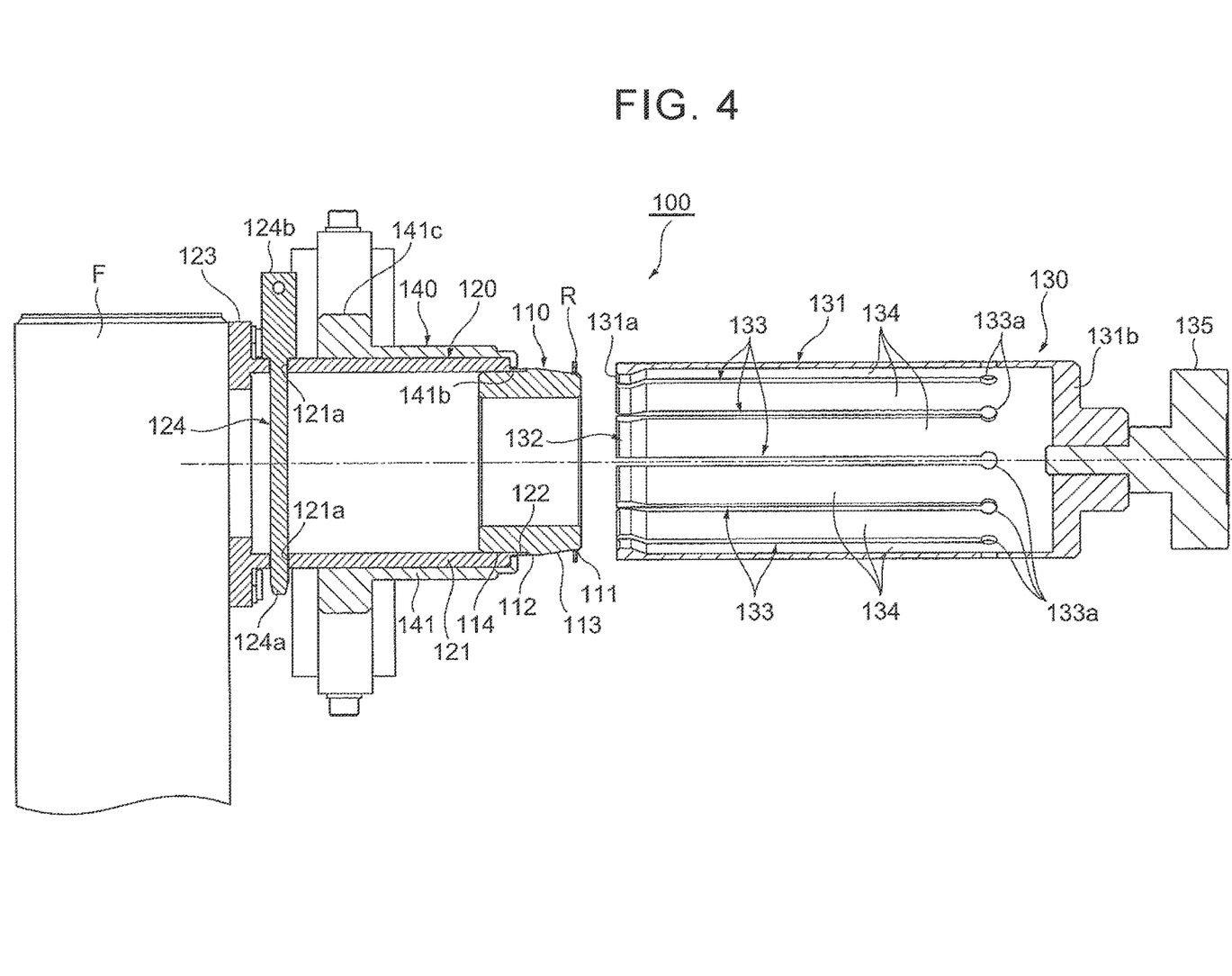
FIG. 4 is a cross-sectional view of the ring mounting jig of FIG. 3.
Figure 5:
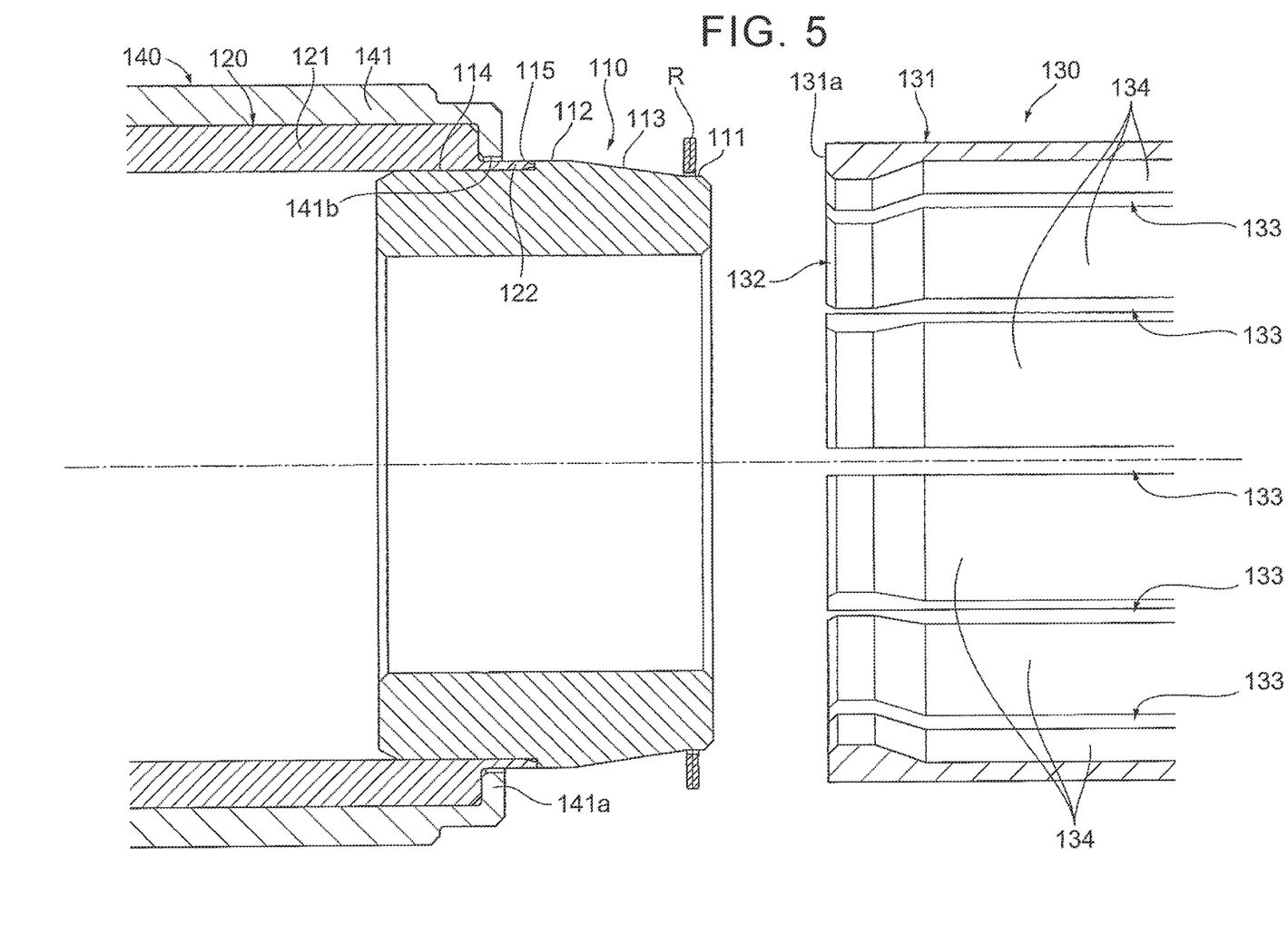
FIG. 5 is an enlarged view of the vicinity of the ring expanding jig constituting the ring mounting jig of FIG. 4.

FIG. 3 is an exploded perspective view illustrating an embodiment of a ring mounting jig according to the present disclosure. FIG. 4 is a cross-sectional view of the ring mounting jig 100 of FIG. 3. FIG. 5 is an enlarged view of the vicinity of the ring expanding jig 110 constituting the ring mounting jig 100 of FIG. 4. The ring mounting jig 100 of the present embodiment, as described above, the first end portion S1, the second end portion S2 having an outer diameter larger than the first end portion S1, the first groove S11 and the second groove S21 provided in the circumferential direction of the outer peripheral surface of each of the first end portion S1 and the second end portion S2, the shaft S, is used to mount the metallic retaining ring R.

More specifically, the ring mounting jig 100 of the present embodiment is used to mount a metallic retaining ring R whose inner diameter before expansion is smaller than the outer diameter of the first end portion S1 of the shaft S to the second groove S21 on the second end portion S2 without mounting the retaining ring R from the first end portion S1 of the shaft S to the first groove S11. The ring mounting jig 100 includes, for example, a ring expanding jig 110, a shaft fixing jig 120, a ring pushing jig 130, and a ring fitting jig 140.

The ring expanding jig 110 has, for example, a generally cylindrical or cylindrical shape. In the examples illustrated in FIGS. 3 to 5, the ring expanding jig 110 is, for example, a metal hollow member having a cylindrical shape having an axial length smaller than an outer diameter and having openings at both ends in the axial direction. As illustrated in FIG. 5, the ring expanding jig 110 includes, for example, a small diameter end 111, an enlarged portion 112, a tapered surface 113, an insertion portion 114, and a step portion 115.

The small diameter end 111 of the ring expanding jig 110 is, for example, one end of the cylindrical ring expanding jig 110 in the axial direction, and has an outer diameter smaller than the inner diameter of the retaining ring R before expansion. That is, the small diameter end 111 of the ring expanding jig 110 can be inserted inside the retaining ring R. Further, the corner portion of the outer edge of the small diameter end 111 is chamfered.

The enlarged portion 112 of the ring expanding jig 110 has an outer diameter corresponding to the outer diameter D2 of the second end portion S2 of the shaft S. Here, the outer diameter corresponding to the outer diameter D2 of the second end portion S2 of the shaft S includes, for example, an outer diameter in which the difference between the outer diameter equal to the outer diameter D2 of the second end portion S2 and the outer diameter D2 of the second end portion S2 is within a predetermined tolerance range. In other words, the outer diameter corresponding to the outer diameter D2 of the second end portion S2 of the shaft S is substantially the same as the outer diameter D2 of the second end portion S2. The outer circumferential surface of the enlarged portion 112 is a cylindrical surface parallel to the axial direction of the ring expanding jig 110.

The tapered surface 113 of the ring expanding jig 110 is a surface connecting the small diameter end 111 and the enlarged portion 112. The tapered surface 113 is, for example, a side surface of a truncated cone sharing a central axis with the ring expanding jig 110, and has a tapered shape in which the outer diameter decreases at a constant rate from the enlarged portion 112 to the small diameter end 111. An end portion of the tapered surface 113 opposite to the small diameter end 111 is smoothly connected to an outer peripheral surface of the enlarged portion 112. The tapered surface 113 is used to radially expand the retaining ring R, as described below.

The insertion portion 114 of the ring expanding jig 110 is a cylindrical or cylindrical portion provided at an end portion of the ring expanding jig 110 opposite to the small diameter end 111. The outer peripheral surface of the insertion portion 114 is, for example, a cylindrical surface parallel to the central axis of the ring expanding jig 110. At an end portion of the insertion portion 114 opposite to the small diameter end 111 of the ring expanding jig 110, a corner portion of the outer edge portion of the insertion portion 114 is chamfered. The insertion portion 114 of the ring expanding jig 110 is inserted inside the cylindrical portion 121 of the shaft fixing jig 120.

The insertion portion 114 has an outer diameter corresponding to the outer diameter D1 of the first end portion S1 of the shaft S. Here, the outer diameter corresponding to the outer diameter D1 of the first end portion S1 of the shaft S includes, for example, an outer diameter in which the difference between the outer diameter equal to the outer diameter D1 of the first end portion S1 and the outer diameter D1 of the first end portion S1 is within a predetermined tolerance range. In other words, the outer diameter corresponding to the outer diameter D1 of the first end portion S1 of the shaft S is substantially the same as the outer diameter D1 of the first end portion S1. That is, the outer diameter of the insertion portion 114 corresponding to the outer diameter D1 of the first end portion S1 of the shaft S is smaller than the outer diameter of the enlarged portion 112 corresponding to the outer diameter D2 of the second end portion S2 of the shaft S.

The step portion 115 of the ring expanding jig 110 is formed between the insertion portion 114 and the enlarged portion 112. The step portion 115 is, for example, an annular surface formed between the outer peripheral surface of the enlarged portion 112 and the outer peripheral surface of the tapered surface 113 and perpendicular to the axial direction of the ring expanding jig 110 and parallel to the radial direction of the ring expanding jig 110. The step portion 115 abuts against the tip end of the ring holding portion 122 of the shaft fixing jig 120 when the insertion portion 114 of the ring expanding jig 110 is inserted into the cylindrical portion 121 of the shaft fixing jig 120.

The shaft fixing jig 120 is, for example, a metal member having a generally cylindrical shape. The shaft fixing jig 120 supports and fixes the ring expanding jig 110 or the shaft S by inserting a part of the ring expanding jig 110 or the shaft S. The shaft fixing jig 120 includes, for example, a cylindrical portion 121 and a ring holding portion 122. In the example illustrated in FIGS. 3 and 4, the shaft fixing jig 120 includes a flange 123 and a fixing pin 124.

The cylindrical portion 121 is a cylindrical portion having an inner diameter corresponding to the outer diameter D1 of the first end portion S1 of the shaft S. Here, the inner diameter corresponding to the outer diameter D1 of the first end portion S1 of the shaft S includes, for example, an inner diameter having a predetermined negative tolerance from the outer diameter D1 of the first end portion S1. In other words, the inner diameter corresponding to the outer diameter D1 of the first end portion S1 of the shaft S, when the first end portion S1 of the shaft S is inserted into the cylindrical portion 121, the outer peripheral surface of the first end portion S1 and the inner peripheral surface of the cylindrical portion 121 It is an inner diameter that a gap of a predetermined tolerance is formed between.

The cylindrical portion 121 has a through-hole 121a at an end opposite to the axial ring holding portion 122. The through-hole 121a is provided corresponding to the position and size of the through-hole S5 provided on the first end portion S1 of the shaft S to be inserted into the cylindrical portion 121, and the fixing pin 124 is inserted therethrough. That is, the first end portion S1 of the shaft S is inserted into the cylindrical portion 121, and the positions of the through-hole S5 on the first end portion S1 and the through-hole 121a of the cylindrical portion 121 are aligned, and the fixing pins 124 are inserted into these through-holes S5,121a. Thus, the shaft S can be fixed to the cylindrical portion 121 of the shaft fixing jig 120 (see FIG. 7).

The total dimension of the cylindrical portion 121 and the ring holding portion 122 in the axial direction of the shaft fixing jig 120 is equal to the dimension from the end face on the first end portion S1 to the second end portion S2 in the axial direction of the shaft S. That is, while the first end portion S1 and the intermediate portion S4 of the shaft S are inserted into the cylindrical portion 121 of the shaft fixing jig 120 and the shaft S is fixed to the shaft fixing jig 120, the entire outer peripheral surface of the shaft S on the second end portion S2 is exposed from the shaft fixing jig 120 (see FIG. 7).

The ring holding portion 122 of the shaft fixing jig 120 is provided at the axial tip end of the cylindrical portion 121, and has an outer diameter corresponding to the outer diameter of the second end portion S2 of the shaft S, similarly to the enlarged portion 112 of the ring expanding jig 110 described above. That is, the outer diameter of the ring holding portion 122 is substantially the same as the outer diameter of the second end portion S2 of the shaft S and the outer diameter of the enlarged portion 112 of the ring expanding jig 110.

Like the cylindrical portion 121 described above, the ring holding portion 122 has an inner diameter corresponding to the outer diameter of the insertion portion 114 of the ring expanding jig 110 and the outer diameter D1 of the first end portion S1 of the shaft S. That is, the inner diameter of the ring holding portion 122 is smaller than the outer diameter of the insertion portion 114 of the ring expanding jig 110 and the outer diameter D1 of the first end portion S1 of the shaft S by a predetermined tolerance, the insertion portion 114 of the ring expanding jig 110 It is set to an inner diameter that can be held by inserting the first end portion S1 of the shaft S.

That is, the wall thickness, which is the difference between the outer diameter and the inner diameter of the ring holding portion 122, is substantially equal to the difference between the outer diameter D2 of the second end portion S2 of the shaft S and the outer diameter D1 of the first end portion S1. Further, as shown in FIG. 5, the wall thickness of the ring holding portion 122 is substantially equal to the difference in outer diameter between the enlarged portion 112 and the insertion portion 114 of the ring expanding jig 110, that is, the height of the step portion 115 in the radial direction of the ring expanding jig 110.

The flange 123 is provided at an end portion opposite to the ring holding portion 122 in the axial direction of the cylindrical portion 121. For example, as shown in FIG. 3, the flange 123 is formed in a rectangular plate shape having a dimension that is larger in length and width than the outer diameter of the cylindrical portion 121, and has an opening in a central portion as shown in FIG. 4. The flange 123 has, for example, a plurality of through holes that pass through the flange 123 in the axial direction of the cylindrical portion 121. The shaft fixing jig 120 is fixed to the support structure F by, for example, screwing and fastening a bolt inserted through the flange 123 into a screw hole of the support structure F such as a column fixed to the floor.

Fixing pin 124 is a through hole 121a provided in the cylindrical portion 121 of the shaft fixing jig 120, a round rod-shaped or cylindrical member inserted through the through hole S5 provided in the first end portion S1 of the shaft S to be inserted into the cylindrical portion 121. The fixing pin 124 has, at one end and the other end in the axial direction, a tip end portion 124a having a tapered shape, and a cylindrical proximal end portion 124b whose radial dimension is larger than that of the other portion.

The ring pushing jig 130 is used to push the retaining ring R disposed on the tapered surface 113 of the ring expanding jig 110 toward the enlarged portion 112 in the axial direction of the ring expanding jig 110 to expand in the radial direction. In addition, the ring pushing jig 130 is used to push the extended retaining ring R disposed on the outer peripheral surface of the enlarged portion 112 of the ring expanding jig 110 in the axial direction of the ring expanding jig 110 and move it to the outer peripheral surface of the ring holding portion 122 of the shaft fixing jig 120.

The ring pushing jig 130 includes a main body portion 131, an opening portion 132, a plurality of divided grooves 133, and a plurality of elastic portions 134. In the example shown in FIGS. 3 and 4, the ring pushing jig 130 has a handle 135. The main body portion 131 is, for example, a bottomed cylindrical member made of metal or resin. The opening portion 132 is provided on the tip end 131a of the main body portion 131 and has an inner diameter corresponding to an outer diameter of the small diameter end 111 of the ring expanding jig 110.

Here, the inner diameter corresponding to the outer diameter of the small diameter end 111 of the ring expanding jig 110 is an inner diameter which is larger than the outer diameter of the small-diameter end 111 by a predetermined tolerance and into which the small-diameter end 111 can be inserted, and is substantially the same inner diameter as the outer diameter of the small-diameter end 111. With such a configuration, when pushing the retaining ring R by the ring pushing jig 130, it is possible to easily introduce the small diameter end 111 of the ring expanding jig 110 inside the opening portion 132 of the ring pushing jig 130.

The plurality of divided grooves 133 of the ring pushing jig 130 extend from the tip end 131a of the main body portion 131 in the axial direction of the main body portion 131. Further, the plurality of divided grooves 133 are provided at equal intervals in the circumferential direction of the main body portion 131, for example. The plurality of divided grooves 133 extend, for example, from the tip end 131a of the main body portion 131 provided with the opening portion 132 to the vicinity of the bottom 131b of the main body portion 131. Each divided groove 133 has, for example, an extension portion 133a at an end near the bottom 131b of the main body portion 131. The extension portion 133a is, for example, a circular through-hole having a diameter larger than the width of each divided groove 133.

The plurality of elastic portions 134 of the ring pushing jig 130 are formed between the plurality of divided grooves 133, and have a configuration that can be elastically deformed in the radial direction of the main body portion 131. More specifically, the thickness of each of the divided grooves 133, when pushing the ring pushing jig 130 by inserting the small diameter end 111 of the ring expanding jig 110 to the opening portion 132 of the main body portion 131, the outer diameter of the tapered surface 113 It is set to a thickness that can be easily elastically deformed radially outward of the main body portion 131 in accordance with the enlargement of the.

Further, since each of the divided grooves 133 has the extension portion 133a, the width of the fixed end of each of the elastic portions 134 facing away from the tip end 131a of the main body portion 131 is reduced, and each of the elastic portions 134 can be easily elastically deformed radially outward of the main body portion 131. Further, in the tip end 131a of the main body portion 131, which is the free end of the plurality of elastic portions 134, the wall thickness of each of the elastic portions 134 is increased more than that of the other portions. The wall thickness of each of the elastic portions 134 at the tip end 131a of the main body portion 131 is, for example, substantially equal to the radial width of the retaining ring R, that is, the difference between the outer diameter and the inner diameter of the retaining ring R.

The ring fitting jig 140 is disposed on the outer periphery of the cylindrical portion 121 of the shaft fixing jig 120 and is provided so as to be movable in the axial direction of the cylindrical portion 121. As will be described later, in the shaft fixing jig 120, the first end portion S1 of the shaft S is inserted and fixed to the cylindrical portion 121, and the outer peripheral surface of the ring holding portion 122 and the outer peripheral surface of the second end portion S2 of the shaft S are axially connected to the cylindrical portion 121 (see FIG. 7). In this condition, the ring fitting jig 140 has a tip end portion 141a provided so as to be movable from the outer peripheral surface of the ring holding portion 122 of the shaft fixing jig 120 to the second groove S21 on the second end portion S2 of the shaft S (see FIGS. 7 and 8).

More specifically, as shown in FIG. 3, the ring fitting jig 140 includes, for example, a cylindrical main body portion 141 and handles 142 attached to both sides of the main body portion 141. For example, as shown in FIG. 4, the main body portion 141 has an inner diameter corresponding to an outer diameter of the cylindrical portion 121 of the shaft fixing jig 120, is disposed around the cylindrical portion 121 of the shaft fixing jig 120, and is provided so as to be movable in the axial direction.

Here, the inner diameter corresponding to the outer diameter of the cylindrical portion 121 of the shaft fixing jig 120 is an inner diameter larger than the outer diameter of the cylindrical portion 121 by a predetermined tolerance. When the main body portion 141 has such an inner diameter, the cylindrical portion 121 of the shaft fixing jig 120 can be inserted from the opening of the end portion of the main body portion 141 opposite to the tip end portion 141a, and the main body portion 141 of the ring-fitting jig 140 can be disposed around the cylindrical portion 121 of the shaft fixing jig 120.

Further, since the main body portion 141 of the ring fitting jig 140 has an inner diameter corresponding to the outer diameter of the cylindrical portion 121 of the shaft fixing jig 120, the cylindrical portion 121 of the shaft fixing jig 120 and the main body portion 141 of the ring fitting jig 140 can be moved relative to each other in the axial direction. As shown in FIG. 5, the inner diameter of the opening portion 141b provided on the tip end portion 141a of the main body portion 141 of the ring fitting jig 140 is smaller than the inner diameter of the main body portion 141 and slightly larger than the outer diameter of the ring holding portion 122 of the shaft fixing jig 120.

As a result, the tip end portion 141a of the main body portion 141 forms an annular-shaped wall extending from the radially outer side to the inner side of the main body portion 141. The inner wall surface of the tip end portion 141a abuts against the step between the cylindrical portion 121 of the shaft fixing jig 120 and the ring holding portion 122, thereby restricting the movement of the ring fitting jig 140 in the direction approaching the support structure F in the axial direction of the main body portion 141. Further, the outer wall surface of the tip end portion 141a of the main body portion 141 is adapted to abut the retaining ring R disposed on the outer peripheral surface of the ring holding portion 122 of the shaft fixing jig 120 (see FIG. 7).

As illustrated in FIG. 3, for example, a flange 141c having an outer diameter larger than an outer diameter of the main body portion 141 is provided at an end portion of the main body portion 141 opposite to the tip end portion 141a in the axial direction. Handles 142 are attached to both sides of the main body portion 141 in the flange 141c by fastening members such as bolts. The handle 142 is gripped to apply a force in a direction away from the support structure F in the axial direction of the main body portion 141. As a result, as described above, the tip end portion 141a of the main body portion 141 can be moved from the outer peripheral surface of the ring holding portion 122 of the shaft fixing jig 120 to the second groove S21 on the second end portion S2 of the shaft S (see FIGS. 7 and 8).

Figure 6:
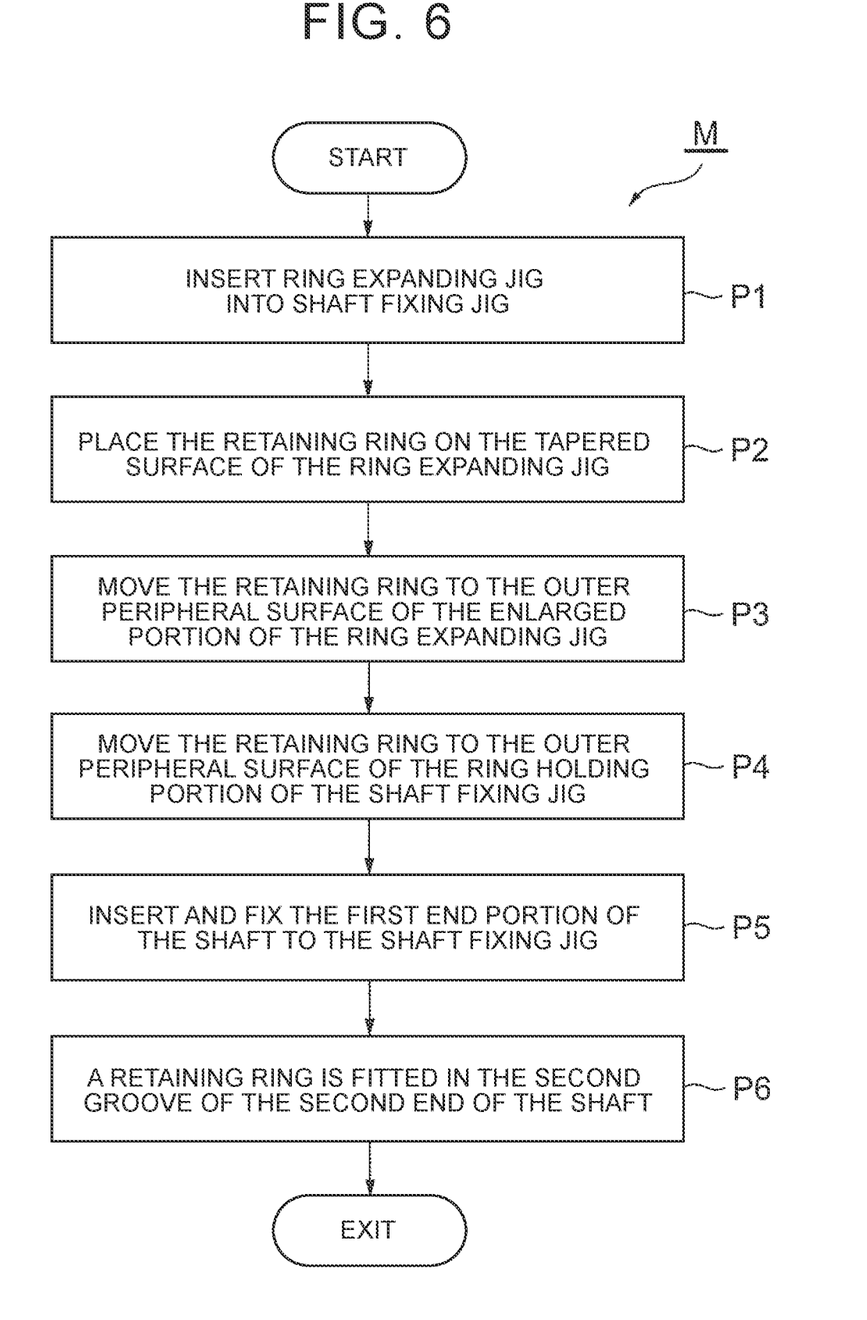
FIG. 6 is a flow diagram illustrating an embodiment of a ring mounting method according to the present disclosure.
Figure 7:
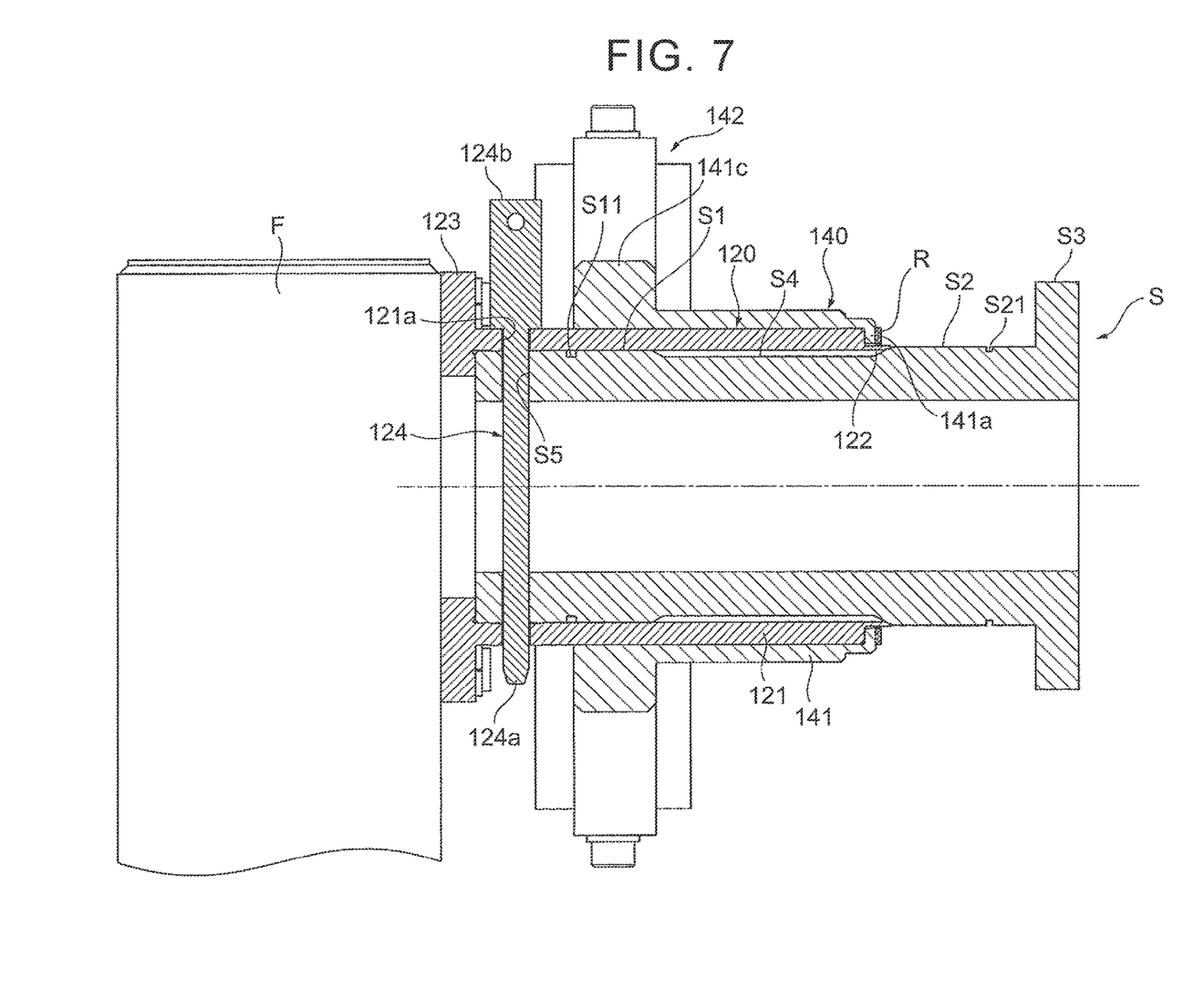
FIG. 7 is a cross-sectional view illustrating a step of fixing a first end portion of a shaft to a shaft fixing jig.

Next, an embodiment of a ring mounting method according to the present disclosure will be described with reference to FIGS. 6 to 8. FIG. 6 is a flow diagram illustrating an embodiment of a ring mounting method according to the present disclosure. The ring mounting method M of the present embodiment is a method of attaching the retaining ring R to the second groove S21 on the second end portion S2 without attaching the retaining ring R to the first groove S1l from the first end portion S1 of the shaft S using the ring mounting jig 100 described above.

As shown in FIG. 6, in the ring mounting method M of the present embodiment, for example, a process P1 of inserting the ring expanding jig 110 into the shaft fixing jig 120 is performed. In this process P1, as shown in FIG. 5, the ring fitting jig 140 of the ring expanding jig 110 is inserted into the cylindrical portion 121 of the shaft fixing jig 120. Then, by bringing the tip end of the ring holding portion 122 of the shaft fixing jig 120 into contact with the step portion 115 of the ring expanding jig 110, the outer peripheral surface of the ring holding portion 122 and the outer peripheral surface of the enlarged portion 112 of the ring expanding jig 110 are connected in the axial direction of the cylindrical portion 121.

Next, a process P2 of disposing the retaining ring R on the tapered surface 113 of the ring expanding jig 110 is performed. In this step P2, as shown in FIG. 5, the small diameter end 111 of the ring expanding jig 110 is inserted inside the retaining ring R, and the retaining ring R is disposed on the tapered surface 113 of the ring expanding jig 110.

Next, a process P3 of moving the retaining ring R to the outer peripheral surface of the enlarged portion 112 of the ring expanding jig 110 is performed. In this process P3, the ring pushing jig 130 is pushed against the ring expanding jig 110 by inserting the small diameter end 111 of the ring expanding jig 110 into the opening portion 132 of the ring pushing jig 130. Accordingly, the retaining ring R disposed on the tapered surface 113 of the ring expanding jig 110 is moved to the outer periphery of the enlarged portion 112 of the ring expanding jig 110 by the plurality of elastic portions 134 of the ring pushing jig 130 to expand in the radial direction.

At this time, the ring pushing jig 130 moves relative to the ring expanding jig 110 in the axial direction of the main body portion 131. Then, the plurality of elastic portions 134 of the ring pushing jig 130, as the outer diameter of the ring expanding jig 110 inside the opening portion 132 of the main body portion 131 is increased by the tapered surface 113, elastically deformed radially outward of the main body portion 131. At the same time, the tip end 131a of the plurality of elastic portions 134 of the ring pushing jig 130 abuts against the retaining ring R, and pushes the retaining ring R axially into the ring expanding jig 110. Accordingly, the retaining ring R can be slid along the tapered surface 113 of the ring expanding jig 110 and moved to the outer peripheral surface of the enlarged portion 112.

Next, a process P4 of moving the retaining ring R from the outer peripheral surface of the enlarged portion 112 of the ring expanding jig 110 to the outer peripheral surface of the ring holding portion 122 of the shaft fixing jig 120 is performed. As shown in FIG. 5, this process P4 is performed while the outer peripheral surface of the ring holding portion 122 of the shaft fixing jig 120 and the outer peripheral surface of the enlarged portion 112 of the ring expanding jig 110 are axially connected to each other in the main body portion 141.

Further, the process P4, the retaining ring R is expanded by the tapered surface 113 of the ring expanding jig 110 by the previous process P3 is started with disposed on the outer peripheral surface of the enlarged portion 112. At this time, the tip end 131a of the plurality of elastic portions 134 of the ring pushing jig 130 is positioned on the outer peripheral surface of the enlarged portion 112, and is elastically deformed radially outward of the main body portion 131. In this condition, the tip end 131a of the plurality of elastic portions 134 of the ring pushing jig 130 is pressed against the retaining ring Ron the outer peripheral surface of the enlarged portion 112, and the ring pushing jig 130 is pushed against the ring expanding jig 110 and the shaft fixing jig 120.

Thus, the retaining ring R is pushed in the axial direction of the ring expanding jig 110 by the plurality of elastic portions 134 of the ring pushing jig 130, the outer peripheral surface of the ring holding portion 122 of the shaft fixing jig 120 from the outer peripheral surface of the enlarged portion 112 of the ring expanding jig 110 shown in FIG. 5, it moves while sliding on the outer peripheral surface. Thereafter, in a state in which the retaining ring R is held on the outer peripheral surface of the ring holding portion 122 of the shaft fixing jig 120, the insertion portion 114 of the ring expanding jig 110 is extracted from the cylindrical portion 121 of the shaft fixing jig 120, and the ring expanding jig 110 is removed from the shaft fixing jig 120.

Next, the step P5 of inserting and fixing the first end portion S1 of the shaft S to the shaft fixing jig 120 is performed. FIG. 7 is a cross-sectional view of the ring mounting jig 100 and the shaft S at the end of the process P5. At the beginning of the process P5, the retaining ring R extended on the outer peripheral surface of the ring holding portion 122 of the shaft fixing jig 120 is held, and the ring expanding jig 110 is removed from the shaft fixing jig 120.

In this condition, the fixing pin 124 is pulled out from the through-hole 121a of the shaft fixing jig 120, and the first end portion S1 of the shaft S is inserted into the opening inside the ring holding portion 122 of the shaft fixing jig 120. Then, the shaft S is inserted into the cylindrical portion 121 until the first end portion S1 of the shaft S abuts against the inner flange 123 of the cylindrical portion 121.

Thus, while the retaining ring R is radially expanded, the retaining ring R can be moved from the first end portion S1 of the shaft S to the vicinity of the second end portion S2 without being attached to the first groove S11. Thereafter, the position of the through-hole S5 of the shaft S and the through-hole 121a of the cylindrical portion 121 is aligned, the fixing pin 124 is inserted into the through-hole S5,121a, and the first end portion S1 of the shaft S is fixed to the cylindrical portion 121 of the shaft fixing jig 120.

Next, the step P6 of fitting the retaining ring R to the second groove S21 of the second end portion S2 of the shaft S is performed. At the beginning of this process P6, as shown in FIG. 7, the outer peripheral surface of the ring holding portion 122 of the shaft fixing jig 120 and the outer peripheral surface of the second end portion S2 of the shaft S are axially connected to the cylindrical portion 121 of the shaft fixing jig 120. That is, the total axial length of the cylindrical portion 121 and the ring holding portion 122 of the shaft fixing jig 120 is equal to the length of the first end portion S1 and the intermediate portion S4 of the shaft S.

Therefore, when the first end portion S1 of the shaft S is inserted into and fixed to the cylindrical portion 121 of the shaft fixing jig 120 in the previous process P5, the entire second end portion S2 of the shaft S is exposed from the shaft fixing jig 120. Then, the outer peripheral surface of the second end portion S2 of the shaft S and the outer peripheral surface of the ring holding portion 122 of the shaft fixing jig 120 are connected to each other in the axial direction of the cylindrical portion 121. In the process P6, in this condition, the ring fitting jig 140 is moved in the axial direction of the cylindrical portion 121 of the shaft fixing jig 120.

Figure 8:
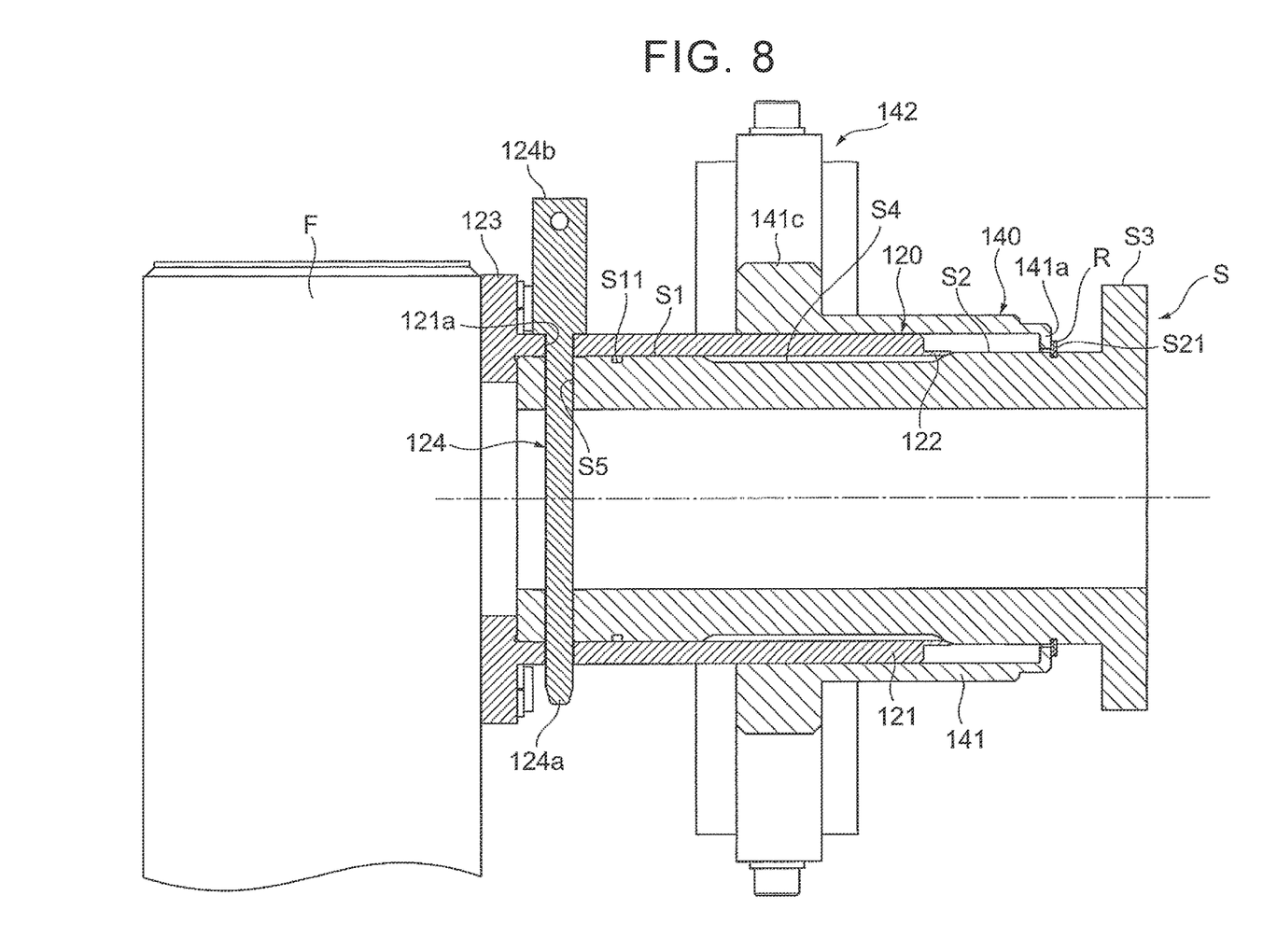
FIG. 8 is a cross-sectional view illustrating a step of fitting a retaining ring in a second groove of the shaft.

FIG. 8 is a cross-sectional view of the ring mounting jig 100 and the shaft S at the end of the process P6. In this process P6, for example, the handle 142 on both sides of the ring fitting jig 140 is gripped and a force is applied away from the support structure F. Thus, the tip end portion 141a of the main body portion 141 of the ring fitting jig 140 moves from the outer peripheral surface of the ring holding portion 122 of the shaft fixing jig 120 to the second groove S21 on the second end portion S2 of the shaft S.

Consequently, the retaining ring R is pushed by the tip end portion 141a of the main body portion 141 of the ring fitting jig 140, and moves while sliding on the outer peripheral surface of the ring holding portion 122 of the shaft fixing jig 120 and the outer peripheral surface of the second end portion S2 of the shaft S, and is fitted to the second groove S21. As described above, the retaining ring R can be attached to the second groove S21 on the second end portion S2 from the first end portion S1 of the shaft S without being attached to the first groove S1*l* by using the ring mounting jig 100.

As described above, the shaft S to which the retaining ring R is mounted by the ring mounting jig 100 of the present embodiment has the first end portion S1, the second end portion S2 having an outer diameter larger than the first end portion S1, and the first groove S1*l* and the second groove S21 provided in the circumferential direction of the outer peripheral surfaces of the first end portion S1 and the second end portion S2. The ring mounting jig 100 is used for mounting a metallic retaining ring R having an inner diameter before being expanded smaller than an outer diameter of the first end portion S1 to the second groove S21 on the second end portion S2 without mounting the retaining ring R from the first end portion S1 to the first groove S11. The ring mounting jig 100 includes a ring expanding jig 110, a shaft fixing jig 120, a ring pushing jig 130, and a ring fitting jig 140. ring expanding jig 110 has a small diameter end 111 having an outer diameter smaller than the inner diameter of the retaining ring R before expansion, an enlarged portion 112 having an outer diameter corresponding to the outer diameter of the second end portion S2 of the shaft S, a tapered surface 113 connecting the small diameter end 111 and the enlarged portion 112, an insertion portion 114 having an outer diameter corresponding to the outer diameter of the first end portion S1 of the shaft S, and a step portion 115 formed between the insertion portion 114 and the enlarged portion 112. The shaft fixing jig 120 includes a cylindrical portion 121 having an inner diameter corresponding to an outer diameter of the first end portion S1 of the shaft S, and a ring holding portion 122 provided at an axially tip end of the cylindrical portion 121 and having an outer diameter corresponding to an outer diameter of the second end portion S2 of the shaft S. Ring pushing jig 130 has a cylindrical body portion 131, an opening portion 132 having an inner diameter corresponding to the outer diameter of the small diameter end 111 of the ring expanding jig 110 provided at the tip end of the main body portion 131, a plurality of divided grooves 133 extending in the axial direction of the main body portion 131 from the tip end 131a of the main body portion 131, a plurality of elastic portions 134 which are formed between the plurality of divided grooves 133 and can be elastically deformed in the radial direction of the main body portion 131. The ring fitting jig 140 is disposed on the outer periphery of the cylindrical portion 121 of the shaft fixing jig 120 and is provided so as to be movable in the axial direction of the cylindrical portion 121. Ring fitting jig 140, the first end portion S1 of the shaft S is inserted and fixed to the cylindrical portion 121, the outer peripheral surface of the ring holding portion 122 of the shaft fixing jig 120 and the outer peripheral surface of the second end portion S2 of the shaft S is connected in the axial direction of the cylindrical portion 121 has a tip end portion 141a movable from the outer peripheral surface of the ring holding portion 122 to the second groove S21 of the second end portion S2.

In addition, the ring mounting method M of the present embodiment is a method of mounting the retaining ring R to the second groove S21 on the second end portion S2 without mounting the retaining ring R from the first end portion S1 of the shaft S to the first groove S11 using the ring mounting jig 100 described above, and includes the following operations, procedures, or steps. The insertion portion 114 of the ring expanding jig 110 is inserted into the cylindrical portion 121 of the shaft fixing jig 120, and the tip end of the ring holding portion 122 of the shaft fixing jig 120 is brought into contact with the step portion 115 of the ring expanding jig 110. Then, the outer peripheral surface of the ring holding portion 122 and the outer peripheral surface of the enlarged portion 112 of the ring expanding jig 110 are axially connected to the cylindrical portion 121 (step P1). A small diameter end 111 of the ring expanding jig 110 is inserted inside the retaining ring R, and the retaining ring R is disposed on the tapered surface 113 of the ring expanding jig 110 (step P2). A small diameter end 111 of the ring expanding jig 110 is inserted into the opening portion 132 of the ring pushing jig 130, and the ring pushing jig 130 is pushed into the ring expanding jig 110. Then, the retaining ring R disposed on the tapered surface 113 is moved to the outer periphery of the enlarged portion 112 of the ring expanding jig 110 by the plurality of elastic portions 134 of the ring pushing jig 130 to expand radially (step P3). The ring pushing jig 130 is pushed against the ring expanding jig 110 and the shaft fixing jig 120 in a state in which the outer peripheral surface of the ring holding portion 122 of the shaft fixing jig 120 and the outer peripheral surface of the enlarged portion 112 of the ring expanding jig 110 are connected in the axial direction of the cylindrical portion 121. Then, the retaining ring R that is disposed on the outer peripheral surface of the enlarged portion 112 of the ring expanding jig 110 and expanded is moved to the outer peripheral surface of the ring holding portion 122 of the shaft fixing jig 120 by the plurality of elastic portions 134 (step P4). The first end portion S1 of the shaft S is inserted into and fixed to the cylindrical portion 121 of the shaft fixing jig 120, and the outer peripheral surface of the ring holding portion 122 and the outer peripheral surface of the second end portion S2 of the shaft S are axially connected to the cylindrical portion 121 (step P5). In this condition, the ring fitting jig 140 is moved in the axial direction of the cylindrical portion 121, the retaining ring R disposed on the outer peripheral surface of the ring holding portion 122 is moved to the outer peripheral surface of the second end portion S2 of the shaft S by the tip end portion 141a of the ring fitting jig 140 is fitted to the second groove S21 (step P6).

With such a configuration, according to the ring mounting jig 100 and the ring mounting method M of the present embodiment, the inner diameter before expansion is smaller than the outer diameter of the first end portion S1 of the shaft S, and the metallic retaining ring R that is difficult to expand radially can be easily expanded by the ring expanding jig 110 and the ring pushing jig 130. Further, the extended retaining ring R can be held on the outer peripheral surface of the enlarged portion 112 of the ring expanding jig 110 having an outer diameter corresponding to the outer diameter of the second end portion S2 of the shaft S.

Further, the outer peripheral surface of the enlarged portion 112 of the ring expanding jig 110, and the outer peripheral surface of the ring holding portion 122 of the shaft fixing jig 120 having an outer diameter corresponding to the outer diameter of the second end portion S2 of the shaft S like the enlarged portion 112 can be axially connected to the cylindrical portion 121. Thus, the extended retaining ring R held on the outer peripheral surface of the enlarged portion 112 is pushed by the ring pushing jig 130, to the outer peripheral surface of the ring holding portion 122 of the shaft fixing jig 120, it is possible to easily move.

Therefore, the first end portion S1 of the shaft S can be inserted into and fixed to the cylindrical portion 121 of the shaft fixing jig 120 while the retaining ring R extended to the outer peripheral surface of the ring holding portion 122 is held. Thus, the extended retaining ring R can be easily moved from the first end portion S1 of the shaft S to the vicinity of the second end portion S2 without being attached to the first groove S11, and the working hours can be shortened by eliminating redoing the working.

In addition, the outer peripheral surface of the ring holding portion 122 having an outer diameter corresponding to the outer diameter of the second end portion S2 of the shaft S and the outer peripheral surface of the second end portion S2 of the shaft S can be connected to each other in the axial direction of the shaft S. Further, by moving the tip end portion 141a of the ring fitting jig 140 from the outer peripheral surface of the cylindrical portion 121 of the shaft fixing jig 120 to the second groove S21 of the outer peripheral surface on the second end portion S2 of the shaft S, the retaining ring R can be attached to the second groove S21. This eliminates the need for a large amount of force and a high level of technology for mounting the retaining ring R, thereby reducing the load on the mounting work and improving the safety of the work.

As described above, according to the present embodiment, with respect to the shaft S having the first groove S11 and the second groove S21 at the first end portion S1 and the second end portion S2, respectively, the retaining ring R made of a metal whose inner diameter before expansion is smaller than the outer diameter of the first end portion 51 and the second end portion S2, without mounting from the first end portion S1 to the first groove S11, it is possible to provide the ring mounting jig 100 and the ring mounting method M that can be mounted on the second groove S21.

Note that the ring mounting jig and the ring mounting method according to the present disclosure are not limited to the above-described embodiments. Hereinafter, a modified example of the ring mounting jig 100 and the ring mounting method M according to the above-described embodiment will be described with reference to FIG. 9 with reference to FIGS. 1 to 8 according to the above-described embodiment. The ring mounting jig 100 of the present modification example includes the auxiliary jig 150 shown in FIG. 9 in addition to the ring expanding jig 110, the shaft fixing jig 120, the ring pushing jig 130, and the ring fitting jig 140 described above.

Figure 9:
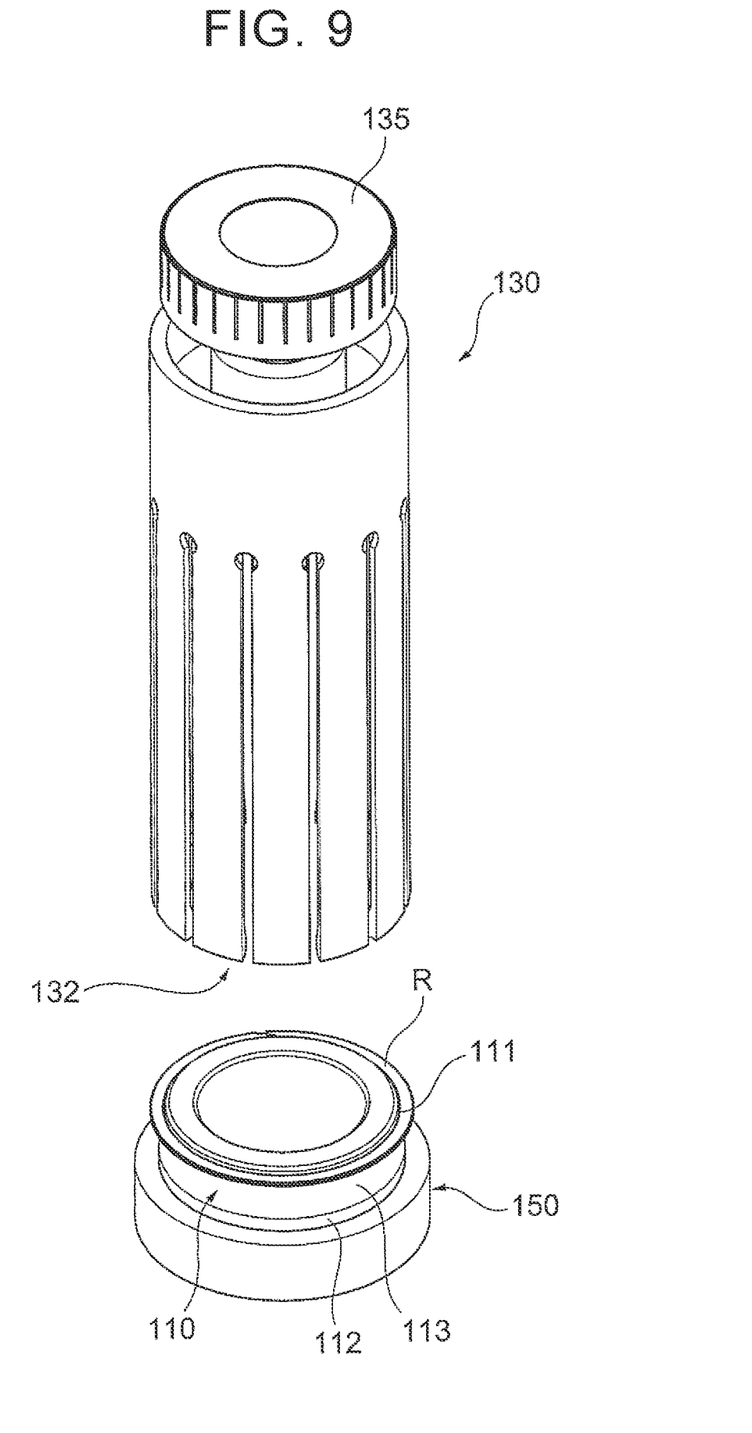
FIG. 9 is an exploded perspective view illustrating a modification of the ring mounting jig and the ring mounting method.

The auxiliary jig 150 is, for example, a disk-shaped or cylindrical member having an outer diameter larger than the outer diameter of the enlarged portion 112 of the ring expanding jig 110. The auxiliary jig 150 has an inner diameter and a depth corresponding to the outer diameter and the axial length of the insertion portion 114 of the ring expanding jig 110 in the central portion, and has a through hole into which the insertion portion 114 can be inserted.

The ring mounting method M of the present modification is different from the ring mounting method M according to the above-described embodiment in that the process P2 and the process P3 are performed prior to the process P1 shown in FIG. 6. More specifically, in the process P2, as shown in FIG. 9, the auxiliary jig 150 is disposed on the floor surface, the insertion portion 114 of the ring expanding jig 110 is inserted into the through hole of the auxiliary jig 150, and the small diameter end 111 of the ring expanding jig 110 is disposed facing upward. Then, the small diameter end 111 of the ring expanding jig 110 is inserted into the inner side of the retaining ring R, and the retaining ring R is disposed on the tapered surface 113 of the ring expanding jig 110.

Next, in the process P3, the small diameter end 111 of the ring expanding jig 110 is inserted into the opening portion 132 of the ring pushing jig 130 directed downward, a force is applied downward to the handle 135 of the ring pushing jig 130, and the retaining ring R is moved to the outer peripheral surface of the enlarged portion 112. Accordingly, the worker can apply a force to the handle 135 of the ring pushing jig 130 by utilizing his/her weight, and can expand the retaining ring R in the radial direction more easily. Thereafter, the process P1 and the process P4 to the process P6 shown in FIG. 6 are performed.

According to the ring mounting jig 100 and the ring mounting method M of the embodiment of the present modification example, not only can the same effect as the ring mounting jig 100 and the ring mounting method M of the above-described embodiment be obtained, but also the retaining ring R can be expanded in the radial direction more easily.

Although the embodiments of the ring mounting jig and the ring mounting method according to the present disclosure have been described in detail with reference to the drawings, the specific configuration is not limited to this embodiment, and even if there are design changes and the like within a range not departing from the gist of the present disclosure, they are included in the present disclosure.

What is claimed is:

1. A ring mounting jig for mounting, to a shaft provided with a first end portion, a second end portion of which an outer diameter is larger than the first end portion, and a first groove and a second groove provided in a circumferential direction of outer peripheral surfaces of the first end portion and the second end portion, respectively, a retaining ring of which an inner diameter before expansion is smaller than an outer diameter of the first end portion into the second groove of the second end portion from the first end portion without mounting the retaining ring into the first groove, the ring mounting jig comprising:
- a ring expanding jig including a small diameter end of which an outer diameter is smaller than the inner diameter of the retaining ring before expansion, an enlarged portion of which an outer diameter corresponds to the outer diameter of the second end portion of the shaft, a tapered surface that connects the small diameter end and the enlarged portion, and an insertion portion of which an outer diameter corresponds to the outer diameter of the first end portion of the shaft, and a step portion provided between the insertion portion and the enlarged portion;
- a shaft fixing jig including a cylindrical portion of which an inner diameter corresponds to the outer diameter of the first end portion of the shaft, and a ring holding portion that is provided at a tip end of the cylindrical portion in an axial direction and of which an outer diameter corresponds to the outer diameter of the second end portion of the shaft;
- a ring pushing jig including a cylindrical main body portion, an opening portion that is provided at a tip end of the main body portion and of which an inner diameter corresponds to the outer diameter of the small diameter end of the ring expanding jig, a plurality of divided grooves extending in an axial direction of the main body portion from the tip end of the main body portion, and a plurality of elastic portions, each of the elastic portions provided between the divided grooves and being elastically deformable in a radial direction of the main body portion; and
- a ring fitting jig that is disposed on an outer periphery of the cylindrical portion of the shaft fixing jig so as to be movable in an axial direction of the cylindrical portion, and includes a tip end portion that is movable from an outer peripheral surface of the ring holding portion to the second groove of the second end portion in a state where the first end portion of the shaft is inserted into and fixed to the cylindrical portion and the outer peripheral surface of the ring holding portion and the outer peripheral surface of the second end portion of the shaft are connected in the axial direction of the cylindrical portion.

2. A ring mounting method for mounting, using the ring mounting jig according to claim 1, the retaining ring into the second groove of the second end portion from the first end portion of the shaft without mounting the retaining ring into the first groove, the ring mounting method comprising:
- connecting the outer peripheral surface of the ring holding portion and the outer peripheral surface of the enlarged portion of the ring expanding jig in the axial direction of the cylindrical portion by inserting the insertion portion of the ring expanding jig into the cylindrical portion of the shaft fixing jig and causing a tip end of the ring holding portion of the shaft fixing jig to abut the step portion of the ring expanding jig;
- inserting the small diameter end of the ring expanding jig inside the retaining ring and disposing the retaining ring on the tapered surface of the ring expanding jig;
- moving the retaining ring disposed on the tapered surface toward an outer periphery of the enlarged portion of the ring expanding jig using the elastic portions of the ring pushing jig to expand the retaining ring in a radial direction by inserting the small diameter end of the ring expanding jig into the opening portion of the ring pushing jig and pushing the ring pushing jig against the ring expanding jig;
- pushing the ring pushing jig against the ring expanding jig and the shaft fixing jig in a state where the outer peripheral surface of the ring holding portion of the shaft fixing jig and the outer peripheral surface of the enlarged portion of the ring expanding jig are connected in the axial direction of the cylindrical portion, and moving the retaining ring that is disposed on the outer peripheral surface of the enlarged portion of the ring expanding jig and is expanded toward the outer peripheral surface of the ring holding portion of the shaft fixing jig using the elastic portions; and
- inserting the first end portion of the shaft into the cylindrical portion of the shaft fixing jig and fixing the first end portion and moving the ring fitting jig in the axial direction of the cylindrical portion in the state where the outer peripheral surface of the ring holding portion and the outer peripheral surface of the second end portion of the shaft are connected in the axial direction of the cylindrical portion and moving the retaining ring disposed on the outer peripheral surface of the ring holding portion toward the outer peripheral surface of the second end portion using the tip end portion of the ring fitting jig to fit the retaining ring into the second groove.

* * * * *